United States Patent [19]
Park et al.

[11] Patent Number: 5,502,498
[45] Date of Patent: Mar. 26, 1996

[54] CLAMP SIGNAL GENERATION-CONTROL CIRCUIT AND A METHOD THEREFOR

[75] Inventors: Tae J. Park, Anyang; Ho D. Hwang, Seoul; Joong Y. Kwon, Suwon, all of Rep. of Korea

[73] Assignee: Samsung Electronics Co., Ltd., Suwon, Rep. of Korea

[21] Appl. No.: 207,406

[22] Filed: Mar. 7, 1994

[30] Foreign Application Priority Data

| Mar. 10, 1993 | [KR] | Rep. of Korea | 93-3476 |
| Apr. 23, 1993 | [KR] | Rep. of Korea | 93-6852 |
| May 14, 1993 | [KR] | Rep. of Korea | 93-8339 |
| May 19, 1993 | [KR] | Rep. of Korea | 93-8546 |
| May 19, 1993 | [KR] | Rep. of Korea | 93-8547 |

[51] Int. Cl.$^6$ ............................................. H04N 5/18
[52] U.S. Cl. ........................ 348/500; 348/682; 348/689
[58] Field of Search ............................ 348/689, 682, 348/683, 691, 695, 696, 674, 677, 500, 554; H04N 5/18, 5/52, 5/16, 5/202, 5/96

[56] References Cited

U.S. PATENT DOCUMENTS 4,954,880  9/1990  Tanimizu .......................... 348/500

FOREIGN PATENT DOCUMENTS 2276509A  9/1994  United Kingdom ............. H04N 5/18

Primary Examiner—James J. Groody
Assistant Examiner—Nina M. West
Attorney, Agent, or Firm—Ladas & Parry

[57] ABSTRACT

A clamp signal generation-control circuit includes a clamp signal controller for discriminating the existence of a sync on green signal and a separate sync signal supplied from a video card to a monitor to output a control signal according to the discrimination, and a clamp signal generator for automatically changing a generated point of the clamp signal, and a method for controlling the circuit is also provided. The generated point of the clamp signal supplied to the monitor is controlled to automatically shift the clamping position of a video signal, thereby preventing malfunction caused by a nonprofessional user's manipulation, abnormal picture display or the generation of a segment phenomenon. The circuit is adoptable to monitors supplied with various kinds of sync signals.

11 Claims, 11 Drawing Sheets

| CLASSIFICATION | ① | ② | ③ | ①, ④ |
|---|---|---|---|---|
| (A) SYNC ON GREEN | ⊓ | LOW | ⊓ | ① ⊓  ④ ⊔ |
| (B) SEPARATING SYNC | ⊓ | HIGH | ⊔ | ① ⊓  ④ ⊓ |

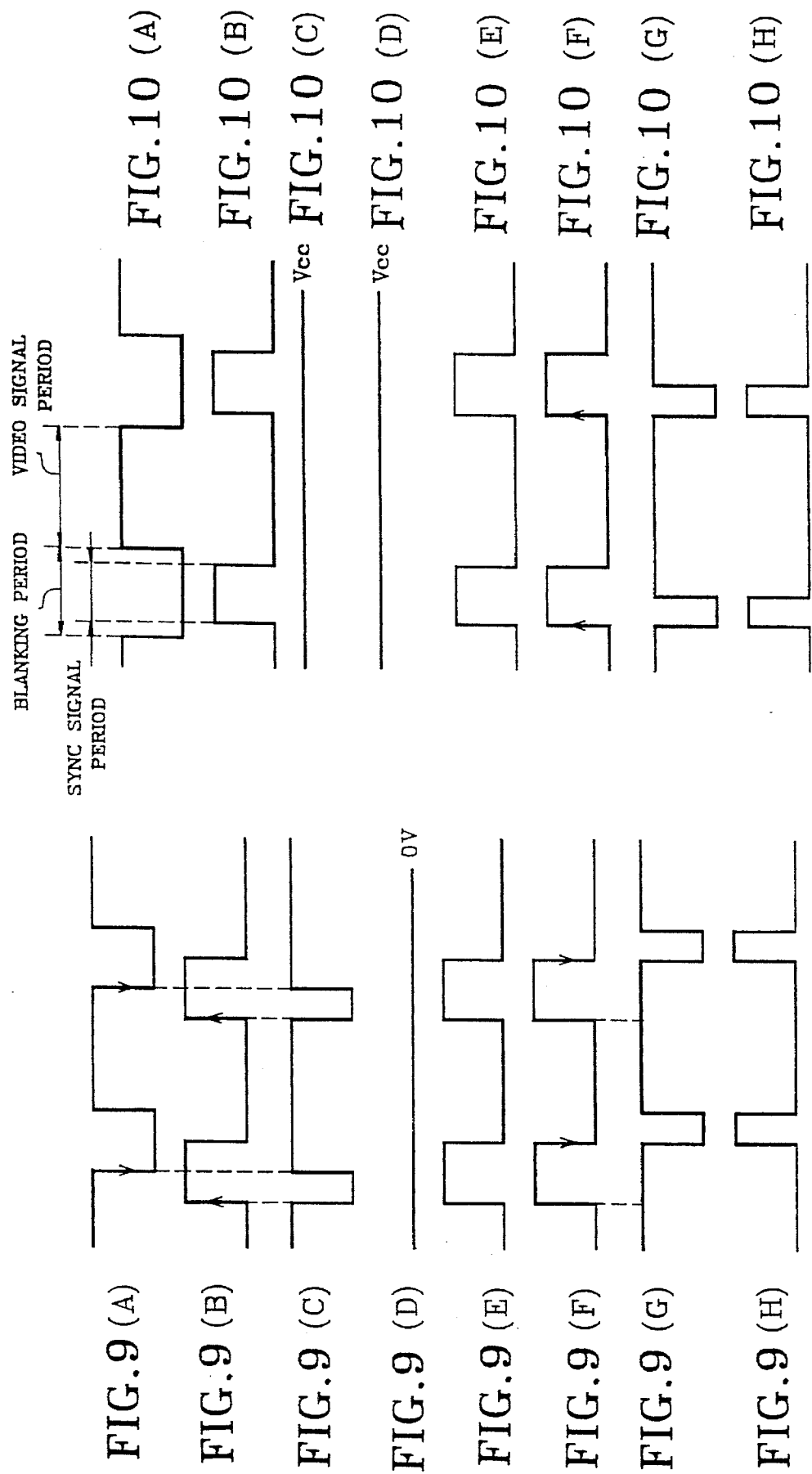

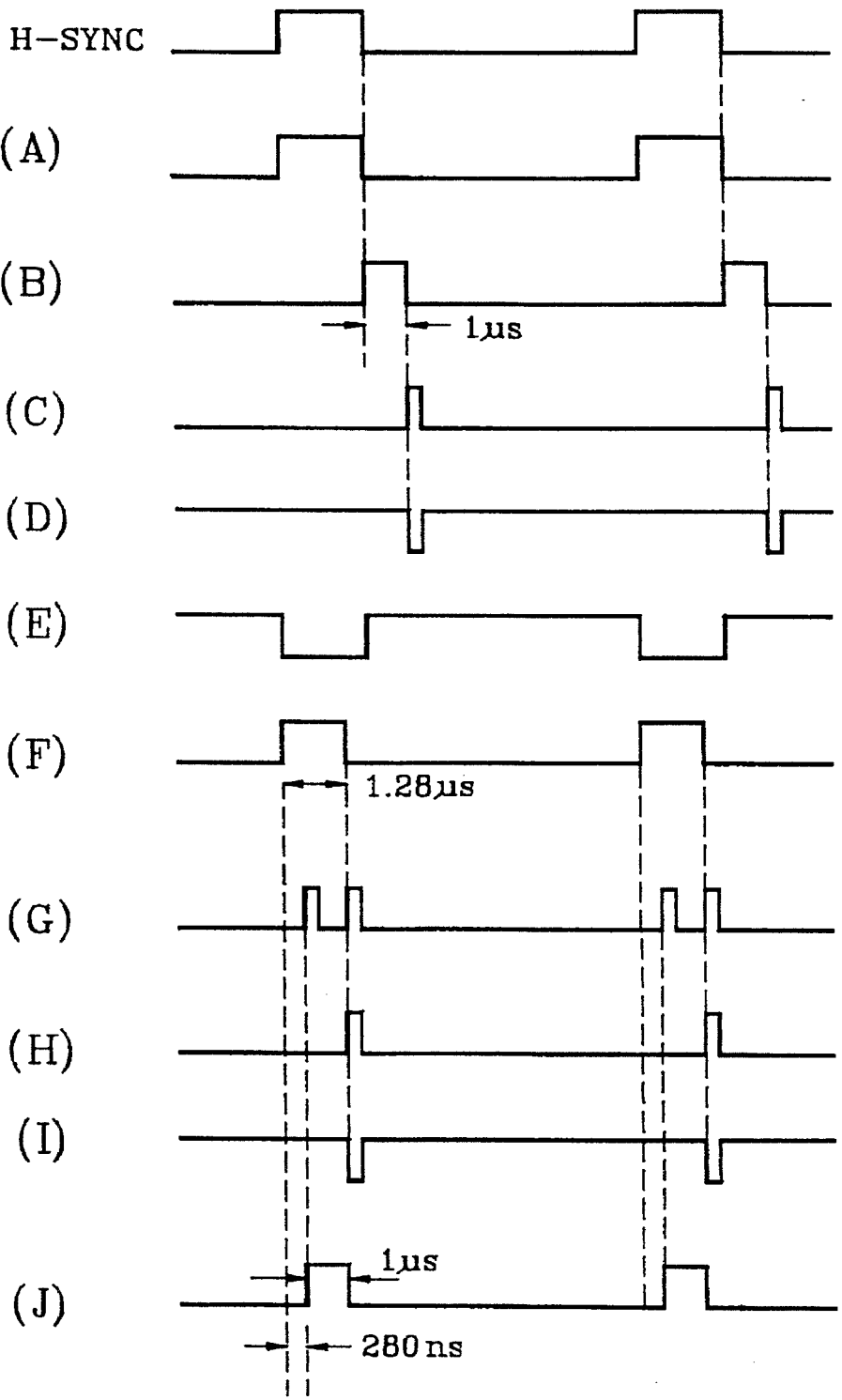

CLAMP SIGNAL GENERATION-CONTROL CIRCUIT AND A METHOD THEREFOR

BACKGROUND OF THE INVENTION

1. Field of the Invention

The present invention relates to a clamp signal generation-control circuit and method therefor, and more particularly to a clamp signal generation-control circuit for discriminating a video signal supplied to a monitor to display a picture whether a sync signal is mixed with a green signal in the video signal and automatically controlling a clamp signal supplied in accordance with the result of the discrimination, and a method for embodying the same.

2. Description of the Prior Art

Picture output apparatuses of a monitor are generally referred as video cards. The video cards are variously provided according to types of the monitors employed.

Signals from the various video cards are such as red (hereinafter simply referred to as "R"), green (G) and blue (B) signals, and horizontal and vertical sync signals.

The horizontal/vertical sync signal supplied from the video card may be separated from the R, G and B signals, or mixed with the G signal. At this time, the signal resulting from nixing the horizontal/vertical sync signal with the G signal is named as "a sync on green signal", and the separately supplied signal to a horizontal/vertical sync signal output terminal is named as "a separate sync signal".

The horizontal sync signal in the separate sync signal is designated as H-SYNC and the vertical sync signal therein is designated as V-SYNC. A clamp signal is for clamping the video signal level. Here, the level clamped by the clamp signal is a position at which the video signal is fixed to 0 V.

FIG. 1 is general waveforms of the signals from the video card, in which respective waveforms represent only the R signal, only the G signal, only the B signal, the H-SYNC in the separate sync signal, the V-SYNC in the separate sync signal, and the sync on green signal showing the state that the H/V sync signal is mixed with the green signal.

The voltage levels of the R, G and B signals in FIG. 1 must be the same. However, if the H-SYNC and V-SYNC are mixed with the G signal, i.e., in case of the sync on green signal of FIG. 1, the voltage level thereof becomes different from those of R, G and B in FIG. 1. In other words, the voltage level of the sync on green signal is heightened as much as the voltage levels of the R, G and B in FIG. 1 loaded with the sync signal.

However, the voltage levels of the signals supplied as shown in FIG. 1 must be the same at any time. In order to constantly control the voltage levels of respective signals, the clamp signal is utilized, and a position of the sync on green signal from which the clamp signal is generated is a reference voltage, i.e., 0 V. That is, when the clamp signal is supplied from a point "a" of the sync on green signal, the potential of the point a is recognized as 0 V. Similarly, if it is supplied from a point "b", the potential thereof is recognized as 0 V.

At this time, the video signal is processed in the monitor, using the level recognized as 0 V as a reference.

Also, in accordance with the type of the sync signal received into the monitor, i.e., by determining the received sync signal whether it is the separate sync signal or sync on green signal, the clamp signal should be triggered at a front or back porch to be outwardly supplied, and then the video signal level is determined by the resultant output. Therefore, it is very important to supply the clamp signal fitted to the kind of the sync signal.

FIG. 2 is a circuit diagram showing a conventional clamp signal generation-control circuit. When the sync on green signal of FIG. 1 is received into a sync signal separating portion 10 via a green signal input terminal G, the sync signal is separated by means of an internally-preset reference voltage to be supplied to a sync signal selecting portion 11, and H-SYNC and V-SYNC are also supplied to the sync signal selecting portion 11.

At this time, the sync signal separating portion 10 may be supplied with only the G signal or the sync on green signal of FIG. 1. In the same manner, the H-SYNC and V-SYNC may or may not be received into the input side of the sync signal selecting portion 11.

If an output signal of the sync signal separating portion 10 and H/V SYNC signal are simultaneously supplied to the sync signal selecting portion 11, the H/V SYNC signal is primarily selected to be supplied to a clamp signal generating portion 12 and a H/V sync separating portion 13.

The clamp signal generating portion 12 triggers an edge of the sync signal selectively supplied from the sync signal selecting portion 11 to generate the clamp signal. Here, the generated clamp signal is mixed on the front or back portion of the sync signal, wherein the front and back portions are manually shifted by switching of a switching portion 14.

Meanwhile, the H/V sync separating portion 13 separates the H/V SYNC signal into the H-SYNC and V-SYNC, using a low-pass filter (not shown). The H-SYNC separated in the H/V sync separating portion 13 is supplied to the unshown monitor unchanged, and V-SYNC is supplied to an adder 15.

The adder 15 adds the V-SYNC from the H/V sync separating portion 13 to V-SYNC from the other side thereof to supply the resultant sum to the monitor.

FIG. 3 is a block diagram schematically showing a conventional clamp signal generation-control circuit similar to that shown in FIG. 2, wherein either the sync on green signal or a sync signal at a TTL (transistor transistor logic) level is selected to output the clamp signal.

To begin with, a sync signal in the sync on green signal received via a sync on green signal input portion 16 is solely separated in a sync signal separating portion 17, and then supplied to a sync signal selecting portion 18. First and second TTL level sync signals are supplied to a TTL level sync signal processing/mixing portion 21 via first and second TTL level sync signal input portions 19 and 20.

Here, the TTL level sync signal denotes a signal received at 0 V/5 V level under the low/high concept which is generally adopted in electronic circuitry. The first and second TTL level sync signals are two types of different sync signals supplied from respective main frames to the monitor when only one monitor is connected to two main frames in personal computers, etc.

The TTL level sync signal processing/mixing portion 21 manually selects to process either one of the first and second TTL level sync signals from the first and second TTL level sync signal input portions 19 and 20, using an unshown switch, and supplies a processed signal to the sync signal selecting portion 18.

The sync signal selecting portion 18 manually selects any one of the sync signals from the sync signal separating portion 17 and the TTL level sync signal processing/mixing portion 21, using the switch, and supplies a selected sync signal to a sync signal processing portion 22 which in turn constantly maintains a polarity of the received sync signal to supply it as a sync signal output and to a clamp signal generating portion 24. The clamp signal generating portion 24 generates the clamp signal triggered at the back porch of the received sync signal to supply it as a clamp signal output.

FIG. 4 is a detailed circuit diagram showing the clamp signal generating portion 12 of FIG. 2, wherein the H-SYNC signal from the sync signal selecting portion 11 of FIG. 2 is supplied to an input side of an exclusive OR gate 26, and a sync signal discriminating portion 27 discriminates a signal in response to a switching control signal from the switching portion 14 of FIG. 2 to supply a logic signal in accordance with the result of the discrimination to other side of the exclusive OR gate 26.

The exclusive OR gate 26 supplies a signal obtained by ORing a logic signal from the sync signal discriminating portion 27 and the H-SYNC to a multivibrator 28, and generates a predetermined frequency signal of which duty is determined in view of a time constant of a capacitor C and a resistor R connected to one side thereof.

The operation of the circuit shown in FIG. 4 will be described in detail with reference to FIG. 5.

The sync signal discriminating portion 27 generates a logic signal of low level when the signal supplied to the monitor is the sync on green signal, or a logic signal of high level when it is the separate sync signal.

Accordingly, when the H-SYNC is supplied to one input terminal of the exclusive OR gate 26 via a horizontal sync signal terminal H SYNC as ① of FIG. 5A, and a sync signal supplied to the monitor by means of the sync signal discriminating portion 27 is determined as the sync on green signal as illustrated in FIG. 5A to be the low signal as ② of FIG. 5A and supplied to other input terminal of the exclusive OR gate 26, the output of the exclusive OR gate 26 is a signal of the high level as ③ of FIG. 5A.

After the output of the exclusive OR gate 26 is supplied to the multivibrator 28, the output pulse duty of the multivibrator 28 is adjusted by the time constant (R, C) to generate the clamp signal triggered at the back porch of the sync signal as ④ of FIG. 5A.

On the other hand, when the horizontal sync signal is supplied to one input terminal of the exclusive OR gate 26 via the horizontal sync signal terminal H SYNC as ① of FIG. 5B, and the sync signal supplied to the monitor by means of the sync signal discriminating portion 27 is determined as the separate sync signal shown in FIG. 5B to be the high signal as ② of FIG. 5B and supplied to other input terminal of the exclusive OR gate 26, the output of the exclusive OR gate 26 is a signal of the low level as ③ of FIG. 5B.

In response to the output of the exclusive OR gate 26, the multivibrator 28 determines the duty of output pulses in view of the time constant by the capacitor C and resistor R connected to one side thereof, and generates the clamp signal triggered at the front porch of the sync signal as ④ of FIG. 5B. At this time, the trigger position of the generated clamp signal of the multivibrator 28 is determined in accordance with the output signal level of the exclusive OR gate 26. In other words, if the output of the exclusive OR gate 26 is high, the clamp signal is triggered at the back porch; otherwise it is triggered at the front porch.

However, in the conventional clamp signal generation-control circuit shown in FIGS. 2 and 3 involves problems as below:

First, when the clamp signal is triggered at the front portion of the sync signal, an abnormal picture is displayed due to a difference between video reference levels if the sync on green signal and the sync signal via the H/V sync signal input terminal are simultaneously supplied.

Second, when the clamp signal is triggered at the back portion of the sync signal, if there is no margin (e.g., in V-7, VRAM2, etc.) between a blanking period of the sync signal, the clamp signal is mixed on the video signal portion to make the video signal portion be 0 V which inhibits the display of the picture.

Third, since the clamp signal must be manually switched for front-to-back shifting performed to trigger the clamp signal at the front or back portion of the sync signal, a nonprofessional user may be confused.

Moreover, in the conventional clamp signal-generation circuit of FIG. 4, if the separate sync signal is received into the monitor as illustrated in FIG. 5B, the timing of the clamp signal from the multivibrator 28 is improper owing to a delay time caused during the RGB composite video signal passing through a gate, etc., when a signal among the separate sync signal as in V-7, VRAM II, etc., having the sync timing same as a blanking timing is supplied. Thus, The clamp signal is generated at the composite video signal portion, so that the composite video signal portion goes to 0 V to induce a segment phenomenon due to the fact that the picture is not displayed.

SUMMARY OF THE INVENTION

The present invention is contrived to solve the above-described problems. Therefore, it is an object of the present invention to provide a clamp signal generation-control circuit for automatically discriminating the existence of a sync on green signal, and automatically supplying a logic signal in accordance with the result of the discrimination to automatically controlling the trigger position of a clamp signal.

It is another object of the present invention to provide a method for controlling the generation of a clamp signal, wherein a trigger pointer of the clamp signal is automatically switched by determining whether a sync signal is mixed with a green signal or not.

It is still another object of the present invention to provide a clamp signal generation-control circuit capable of obtaining a constant amplification characteristic in a video signal regardless of the state of a sync signal to expand a receiving range of a multi-sink monitor, since a delay circuit and a plurality of multivibrators are included therein to automatically discriminate the existence of the sync on green signal and then change the trigger position of the clamp signal.

To achieve the above object of the present invention, there is provided a clamp signal generation-control circuit having a clamp signal controlling circuit which includes a sync signal separating portion for separating and outputting a sync signal mixed with a green signal in a video signal, and a sync signal selecting portion for selectively outputting the sync signal separated in the sync signal separating portion and a sync signal separately supplied thereinto in accordance with a previously-set priority.

Also, a horizontal/vertical sync signal separating portion separates and outputs horizontal and vertical sync signals received from the sync signal selecting portion, and a clamp signal generating portion triggers a clamp signal at a predetermined edge of the sync signal supplied from the sync signal selecting portion. Here, the clamp signal generation-control circuit further includes a clamp signal controlling unit for discriminating the mixing of the sync signal with the green signal and the input of the separately-supplied sync signal by means of the sync signal from the sync signal separating portion and the sync signal selecting portion, and controlling the output of the clamp signal generating portion.

Preferably, the clamp signal controlling unit has a separate sync signal discriminating portion which discriminates the existence of the horizontal sync signal supplied from the sync signal selecting portion, and supplies the result of the discrimination as a logic signal, a counter cleared by the logic signal supplied from the separate sync signal discriminating portion and enabled by the signal from the sync signal separating portion for counting the signal supplied to a clock terminal thereof for a predetermined time and outputting the counted signal as a clamp control signal, and a feedback unit which performs a logical production of a signal obtained by inverting the clamp control signal from the counter with the horizontal sync signal, and supplying the result of the logical production to the clock terminal of the counter.

To achieve another object of the present invention, a clamp signal generation-control method for controlling the output of a clamp signal by determining a sync signal whether it is a sync signal mixed with a video signal or an internally-separated sync signal includes the steps of:

outputting the clamp signal of low level when it is discriminated that the sync signal is not mixed with a green signal or it is not supplied via an input terminal of a horizontal/vertical sync signal input terminal;

generating the clamp signal triggered at the back porch of the sync signal when it is discriminated that only the sync signal is mixed with the green signal;

generating the clamp signal triggered at the back porch of the sync signal when it is discriminated that the sync signal is mixed with the green signal, and, at the same time, the sync signal is supplied via the horizontal/vertical sync signal input terminal; and generating the clamp signal triggered at the front porch of the sync signal when it is discriminated that the sync signal is not mixed with the green signal, but the sync signal is supplied via only the horizontal/vertical sync signal input terminal.

To achieve still another object of the present invention, a clamp signal generation-control circuit includes a sync on green signal separating portion for separating only a sync signal from a sync on green signal received via a sync on green signal input portion, and a TTL level sync signal processing/mixing portion for selecting and mixing either one of first and second TTL level sync signals supplied via first and second TTL level sync signal input portions.

Moreover, a sync signal selecting portion selectively supplies sync signals from the sync on green signal separating portion and the TTL level sync signal processing/mixing portion, a sync signal processing portion constantly maintains the polarity of the sync signal supplied from the sync signal selecting portion, and a clamp signal generating portion converts the trigger position of a clamp signal in accordance with the polarity of the input signal. Here, the clamp signal generation-control circuit further has a delay portion for delaying the output signal of the sync on green signal separating portion by a predetermined time, a sync on green signal discriminating portion for discriminating the existence of the sync on green signal, using the output signals from the delay portion and sync signal processing portion, a pulse detecting portion for outputting a logic signal in response to the result of the discrimination of the existence of the sync on green signal from the sync on green signal discriminating portion, and a pulse converting portion for converting the polarity of the signal supplied from the sync signal processing portion to the clamp signal outputting portion in accordance with the logic signal from the pulse detecting portion.

Furthermore, the present invention provides a clamp signal generation-control circuit for controlling an output of a clamp signal generated in accordance with the type of a sync signal supplied to a monitor includes a sync signal discriminating portion for discriminating the sync signal supplied to the monitor whether it is a sync on green signal or a separate sync signal to output a logic signal, and an exclusive OR gate for exclusively summing the logic signal from the sync signal discriminating portion with the separate sync signal to output the result of the sum. At this time, the clamp signal generation-control circuit further includes a clamp signal generating portion for outputting a signal triggered at the back porch of a horizontal sync signal when the logic signal from the sync signal discriminating portion corresponds to the sync on green signal, a delay portion for outputting the clamp signal triggered after being delayed for a predetermined time at the front porch of the horizontal sync signal when the logic signal from the sync signal discriminating portion corresponds to the separate sync signal, and a clamp signal selecting portion for selectively generating outputs from the clamp signal generating portion and the delay portion in response to the input of the discriminating logic signal of the sync signal discriminating portion.

BRIEF DESCRIPTION OF THE DRAWINGS

The above objects and other advantages of the present invention will become more apparent by describing in detail a preferred embodiment thereof with reference to the attached drawings in which:

FIGS. 9A to 9H illustrate waveforms of respective portions when a sync on green signal is solely received or the sync on green signal and TTL level sync signals are simultaneously received in FIGS. 7 and 8;

FIGS. 10A to 10H illustrate waveforms of respective portions when the TTL level sync signals are solely received in FIGS. 7 and 8;

FIGS. 14A to 14J shows waveforms of operational states of respective portions in FIG. 13.

DETAILED DESCRIPTION OF THE PREFERRED EMBODIMENTS

Figure 2:
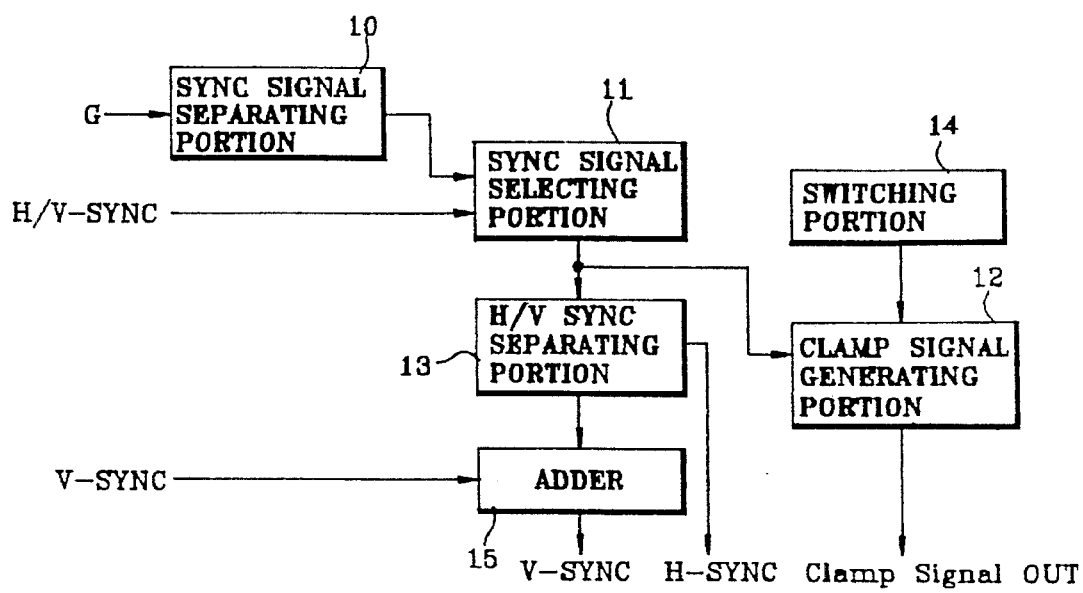
FIG. 2 is a block diagram showing a conventional clamp signal generation-control circuit.
Figure 6:
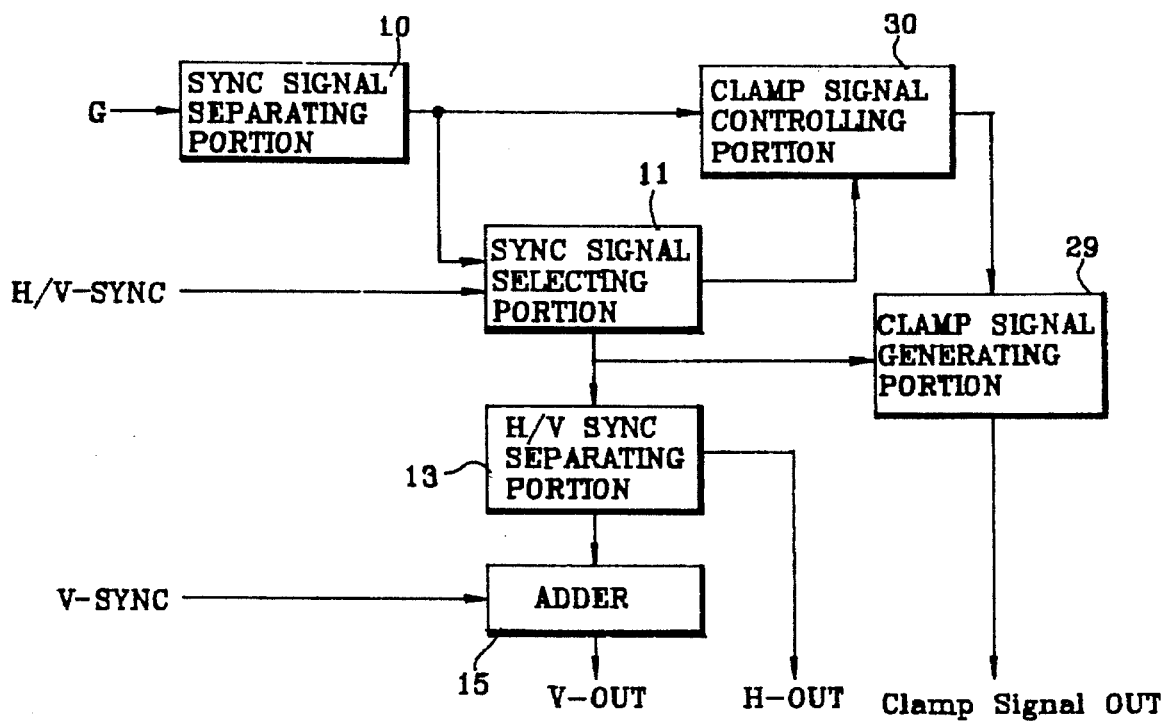
FIG. 6 is a block diagram showing one embodiment of a clamp signal generation-control circuit according to the present invention.

In FIG. 6 illustrating one embodiment of an automatic clamp signal generation-control circuit according to the present invention, the same reference numerals as those in FIG. 2 designate the same parts whose description will thus be omitted.

The present invention provides a clamp signal controlling portion 30 in place of the switch 14 of FIG. 2. One side of the clamp signal control portion 30 is connected to receive an output signal of a sync signal separating portion 10, and other side thereof is connected to receive a signal from a sync signal selecting portion 11. Also, an output signal of the clamp signal controlling portion 30 is supplied to a clamp signal generating portion 29.

Now, the operation of the present invention will be described in detail.

When the G signal or sync on green signal is received into the sync signal separating portion 10, the sync signal separating portion separates the sync signal in accordance with a preset voltage level and supplies the separated sync signal to the sync signal selecting portion 11 whose other side receives H/V SYNC being a separate sync.

Figure 1:
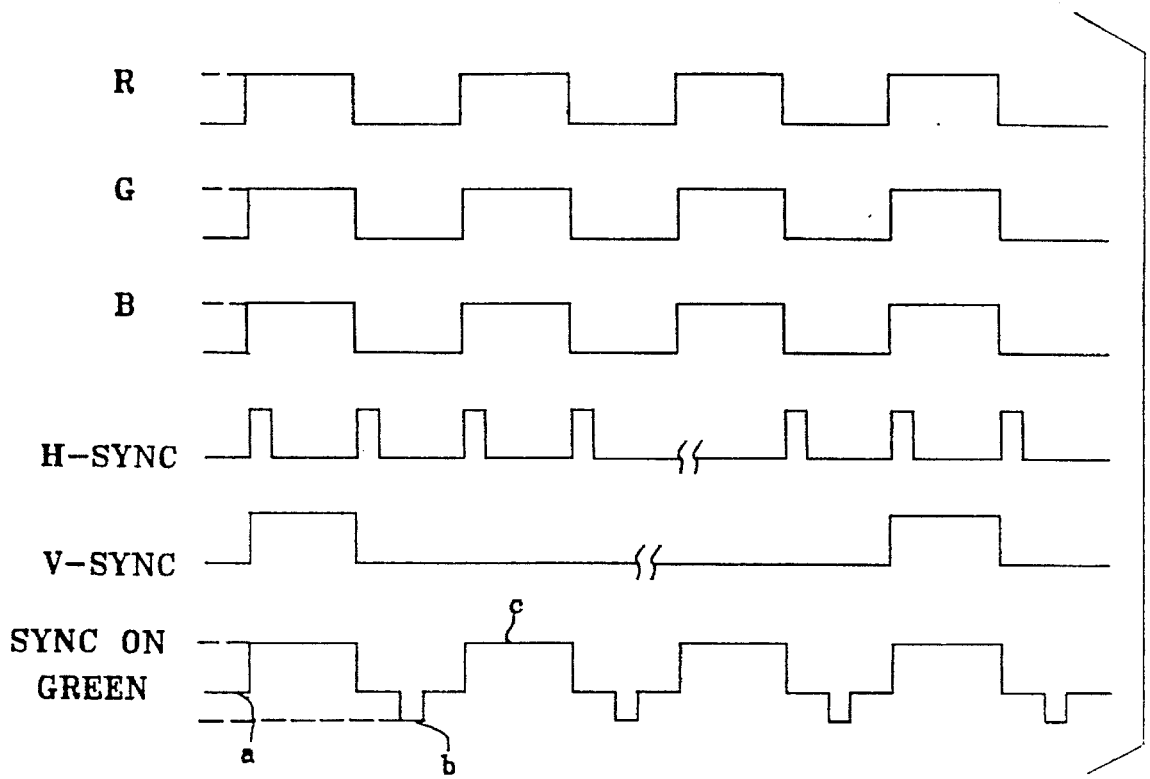
FIG. 1 illustrates waveforms showing examples of general red, green and blue signals, horizontal and vertical sync signals, and mixed sync signals.

In other words, the sync signal separating portion 10 may be supplied with the G signal of FIG. 1, or sync on green signal of FIG. 1. Other side of the sync signal selecting portion 11 is supplied with the H/V SYNC which may not be supplied thereto.

Therefore, if the sync signal from the sync signal separating portion 10 and the H/V SYNC are simultaneously supplied to the sync signal selecting portion 11, the sync signal selecting portion 11 selectively supplies the received sync signal in terms of the previously-set priority to the clamp signal controlling portion 30, a clamp signal generating portion 29, and a H/V sync separating portion 13.

The clamp signal generating portion 29 triggers and generates a clamp signal at a predetermined edge of tile sync signal selected from the sync signal selecting portion 18. At this time, the clamp signal controlling portion 30 receives a signal from the sync signal separating portion 10 and a signal from a sync signal selecting portion 11 to determine the existence of the sync signal, and controls the clamp signal from the clamp signal generating portion 29 as following <Table 1>.

<TABLE 1>

Clamp signal generation state according to a received sync signal

| Discrimination of Received Sync Signal | Output of Clamp Signal Generator |
|---|---|
| No sync signal | Signal output of low level |
| Sync on green | Trigger at back of sync signal |
| Separate sync | Trigger at front of sync signal |
| Sync on green + separate sync | Trigger at back of sync signal |

As can be noted in the above <Table 1>, when no sync signal is discriminated, the clamp signal controlling portion 30 controls the clamp signal generating portion 29 to generate a signal of a low level. Whereas, when it is discriminated that the sync signal is mixed with the G signal or the sync on green signal and H/V sync being the separate sync are simultaneously received, the clamp signal generating portion 29 is controlled to trigger and generate the clamp signal at the back portion of the sync signal. Meantime, if it is determined that the sync signal is not the sync on green signal but is supplied only through H/V SYNC, the clamp signal is triggered and generated at the front portion of the sync signal.

Thus, by discriminating the input of the sync on green signal from the separate sync to automatically shift the triggering pointer of the clamp signal, a nonprofessional user is not confused due to the manual manipulation of switching. Furthermore, the abnormal video display due to a difference between voltage levels or the video segment (nonappearance) phenomenon caused by no margin between the blanking period and sync signal when the clamp signal is generated at the back portion of the sync signal can be prevented.

Figure 3:
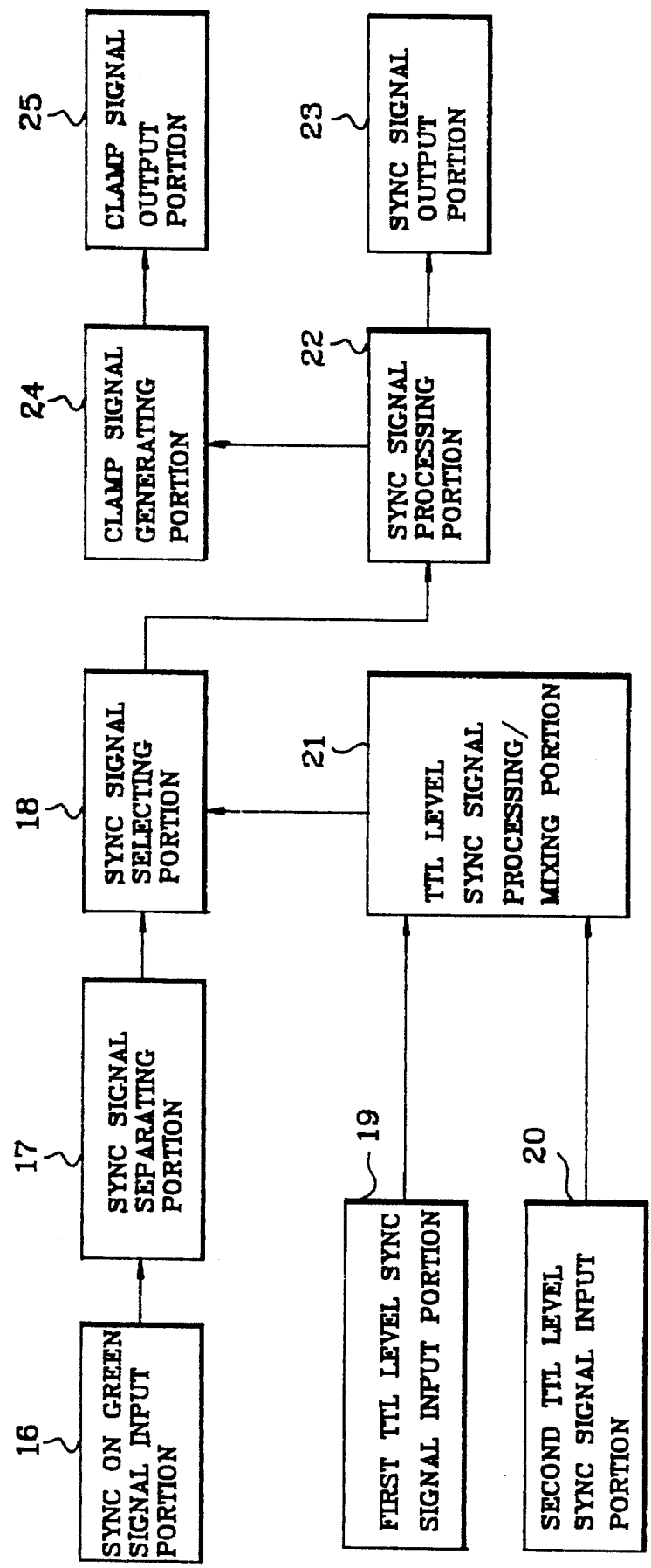
FIG. 3 is a block diagram showing another conventional clamp signal generation-control circuit.
Figure 7:
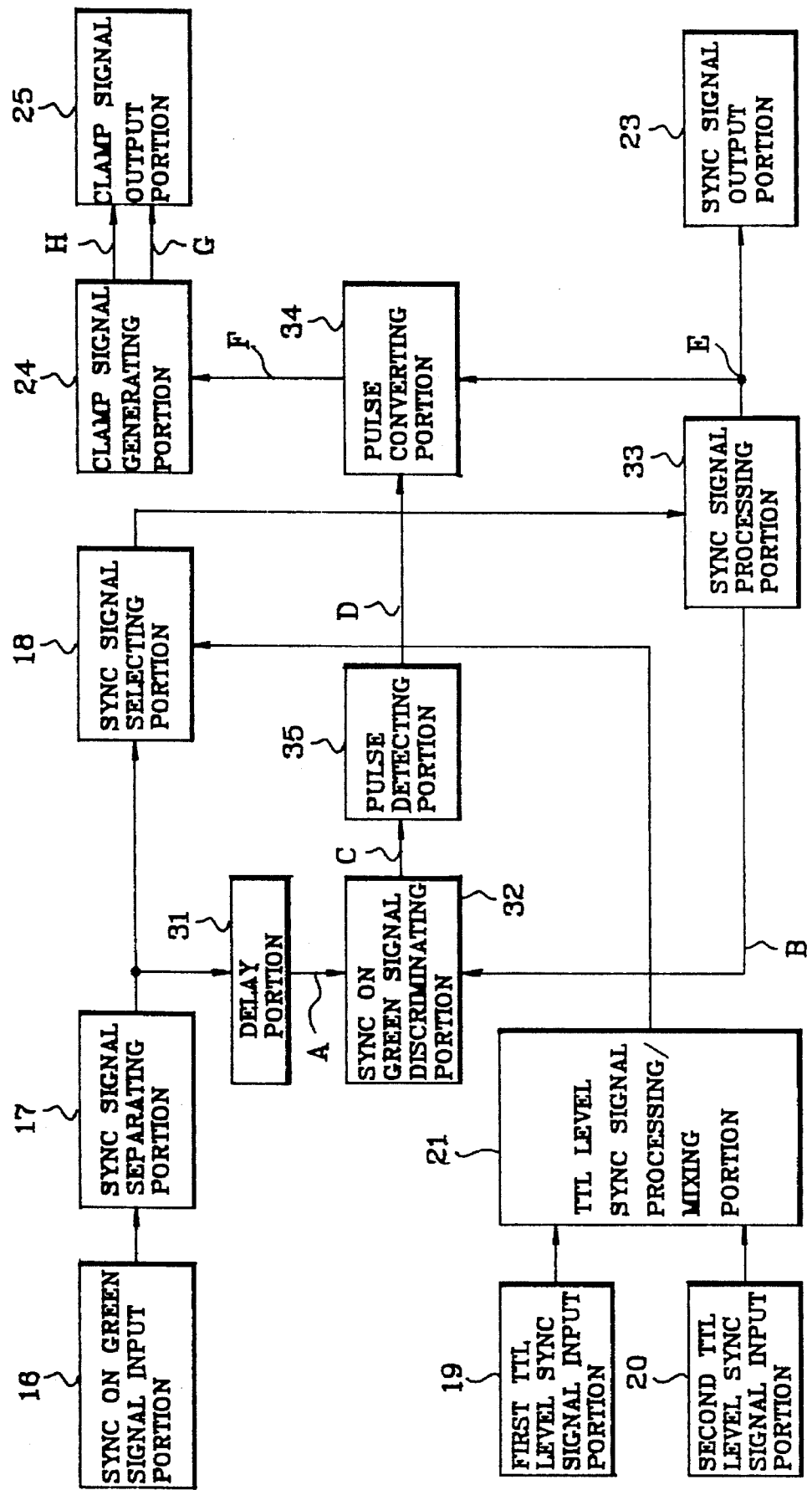
FIG. 7 is a block diagram showing another embodiment of a clamp signal generation-control circuit according to the present invention.

FIG. 7 is a block diagram showing another embodiment of the clamp signal generation-control circuit according to the present invention. Here, the same reference numerals used in FIG. 3 designate the same parts whose detailed description will thus be omitted.

An output of a sync on green signal output portion 17 for separating only the sync signal from the sync on green signal received via a sync on green signal input portion 16 is supplied to both a sync signal selecting portion 18 for selectively supplying any one of a plurality of sync signals and a delay portion 31 for delaying an input signal for a predetermined time. An output terminal of the delay portion 31 is connected to a sync on green signal discriminating portion 32 for discriminating the input of the sync on green signal.

A sync signal processing portion 33 for constantly maintaining the polarity of an output waveform to be positive or negative supplies one output to the sync on green signal discriminating portion 32, and the other output to a pulse converting portion 34. A pulse detecting portion 35 for outputting a high or low signal in accordance with the sync signal discrimination is connected to the output side of the sync on green signal discriminating portion 32. The pulse converting portion 34 inverts or non-inverts a signal from the sync signal processing portion 33 in response to an input signal from the pulse detecting portion 35, thereby outputting the resultant signal to a clamp signal generating portion 24.

Figure 8:
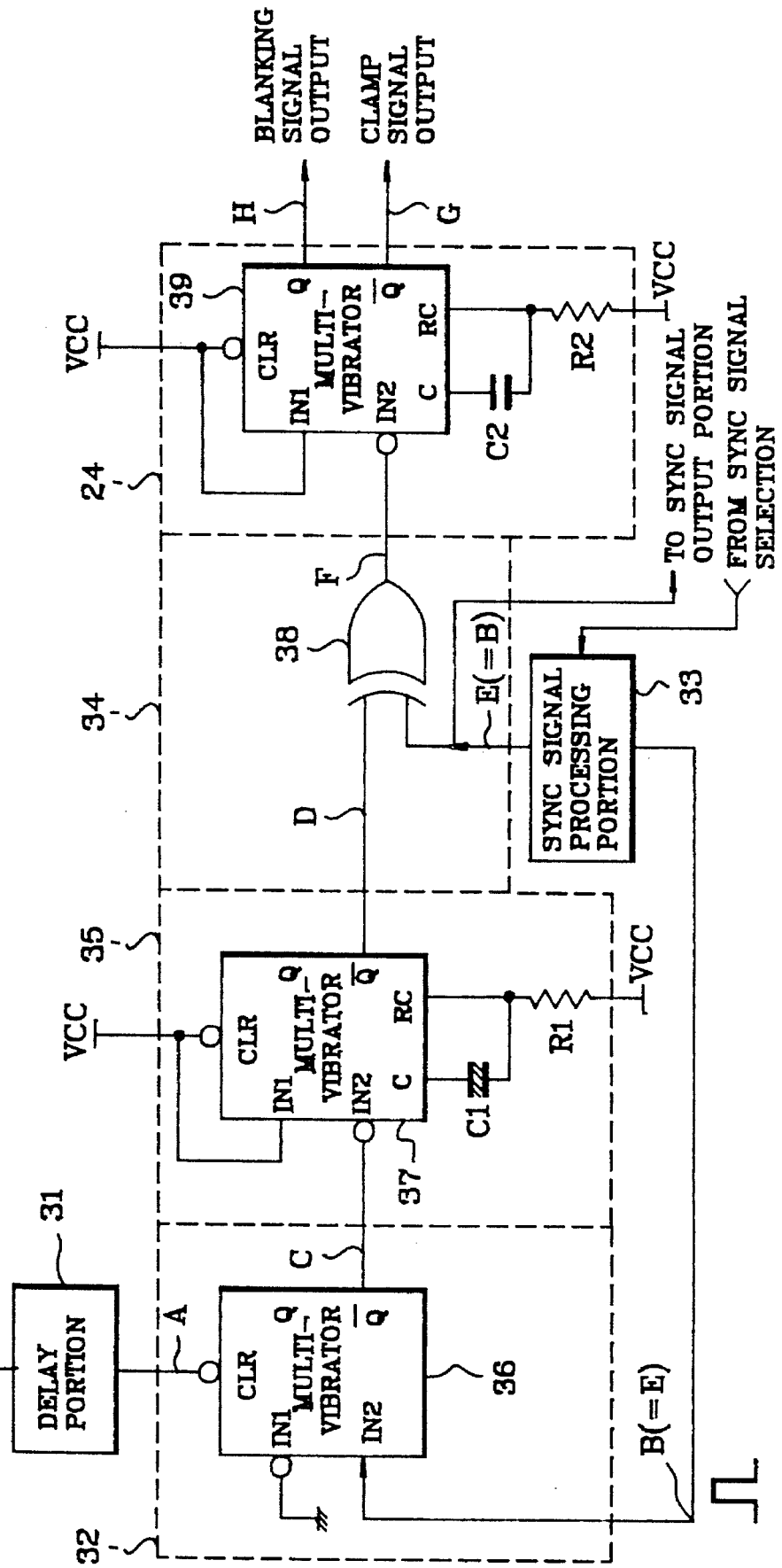
FIG. 8 is a detailed circuit diagram showing the principle portion of FIG. 7.

FIG. 8 is a detailed circuit diagram showing the sync on green signal discriminating portion 32, pulse detecting portion 35, pulse converting portion 34 and clamp signal generating portion 24. Here, the sync on green signal discriminating portion 32 and pulse detecting portion 35 are respectively formed of multivibrators, the pulse converting portion 34 is constructed by an exclusive OR gate 38. The clamp signal generating portion 24 is formed by a multivibrator.

Respective constructions will be described in detail. In a multivibrator 36 constituting the sync signal discriminating portion 32, a clear terminal CLR is connected to the output side of the delay portion 31, and an input terminal IN1 is grounded to fix the supplied voltage level to be low. Also, an input terminal IN2 is connected to an output terminal of the sync signal processing portion 33, and an output terminal /Q is connected to an input terminal IN2 of a multivibrator 37.

The multivibrator 37 forming the pulse detecting portion 35 is connected such that an input terminal IN1 and a clear terminal CLR are supplied with a power source voltage Vcc. Other two input sides C and RC thereof are respectively connected to a resistor R1 whose reference voltage is biased to determine the duty of a trigger waveform generated in accordance with the time constant and a capacitor C1, and an output terminal /Q is connected to an input side of the exclusive OR gate 38.

The exclusive OR gate 38 forming the pulse converting portion 34 is supplied with an output of the multivibrator 37 to one side thereof, and the other end thereof is supplied with an output signal of the sync signal processing portion 33. A multivibrator 39 forming the clamp signal generating portion 24 is connected such that a clear terminal CLR and an input terminal IN1 thereof are supplied with the power source voltage Vcc, an input terminal IN2 is supplied with an output signal of the exclusive OR gate 38, other two input sides C and RC are respectively connected to a resistor R2 whose reference voltage is biased to determine the duty of the trigger waveform generated in accordance with the time constant and a capacitor C2, and output terminals /Q and Q generate a blanking signal and the clamp signal, respectively.

FIGS. 9A to 9H are waveforms of respective portions when the sync on green signal is solely received or the sync on green signal and TTL level sync signals are simultaneously received in FIGS. 7 and 8. FIGS. 10A to 10H are waveforms of respective portions when the TTL level sync signals are solely received in FIGS. 7 and 8. Here, FIG. 10A is an output waveform of the delay portion 31, FIG. 10B is an output waveform from the sync signal processing portion 33 to the sync on green signal discriminating portion 32, FIG. 10C is an output waveform of the sync on green signal discriminating portion 32, and FIG. 10D is of the pulse detecting portion 35. FIG. 10E is a signal waveform supplied from the sync signal processing portion 33 to the pulse converting portion 34 and the sync signal, FIG. 10F is of the pulse converting portion 34, FIG. 10G is of the inverted output terminal /Q of the multivibrator 39 in the clamp signal generating portion 24, and FIG. 10H is a waveform of an output H from the non-inverted output terminal Q of the multivibrator 39 in the clamp signal generating portion 24.

The operations of the portions shown in FIGS. 7 and 8 will now be described with reference to FIGS. 9A to 9H and FIGS. 10A to 10B. The G signal from the sync on green signal input portion 16 may or may not be mixed with the sync signal. That is to say, the sync on green signal or only the G signal may be supplied. Thus, the sync on green signal separating portion 17 compares a predetermined voltage level with a received signal to recognize a signal below the predetermined voltage level as the sync signal and separate to output the result. At this time, a signal supplied to the delay portion 31 may exist or the sync signal may not exist. When the output signal of the sync on green signal separating portion 17 is delayed in the delay portion 31 and then supplied to the sync on green signal discriminating portion 32, the sync signal discriminating portion 32 discriminates the received sync signal.

Here, the sync signal selecting portion 18 of FIG. 7 performing the same operation of the sync signal selecting portion 11 of FIG. 6 generates the sync signal in the order of the previously-set priority in accordance with the existence of the sync on green signal. The output sync signal of the sync signal selecting portion 18 generated as above is supplied from the sync signal processing portion 33 to the sync on green signal discriminating portion 32.

Therefore, the sync on green signal discriminating portion 32 discriminates the received sync signal whether it is the sync on green signal or the TTL level sync signal to output a discriminated signal to the pulse detecting portion 35, Since the discriminated signal is output via the pulse detecting portion 35 and the pulse converting portion 34, the clamp signal generating portion 24 generates the clamp signal triggered at the back porch of the sync signal when only the sync on green signal is received or both the sync on green signal and TTL level sync signal are received thereto; while it generates the clamp signal triggered at the front porch of the sync signal when only the TTL level sync signal is supplied.

First, the case that the sync on green signal is solely supplied will be described.

Only the sync signal is separated from the sync on green signal received via the sync on green signal input portion 16 by means of the sync signal separating portion 17, and then supplied to the sync signal selecting portion 18 and the delay portion 31. The delay portion 31 delays the output of the sync signal separating portion 17 for a predetermined time as shown in FIG. 9A for the purpose of discriminating the sync on green signal.

Meanwhile, the outputs of the sync signal separating portion 17 and the TTL level sync signal processing/mixing portion 21 are supplied to the sync signal selecting portion 18 which in turn selects the sync signal from the sync signal separating portion 17 to supply it to the sync signal processing portion 33. The sync signal processing portion 33 constantly maintains the polarity of the received sync signal. In the present invention, the sync signal processing portion 33 is set to constantly maintain the positive polarity as shown in FIG. 9B.

The output (FIG. 9B) of the sync signal processing portion 33 is supplied to the input terminal IN2 of the multivibrator 36 being the sync on green signal discriminating portion 32, and the output (FIG. 9A) of the delay portion 31 is supplied to the clear terminal CLR of the multivibrator 36 in the sync on green signal discriminating portion 32.

As shown in FIG. 9C, if the output of the delay portion 31 is low, the inverted output /Q of the multivibrator 36 being the sync on green signal discriminating portion 32 necessarily becomes high, and goes to low at the rising edge of the sync signal received via the input terminal IN2 when the output of the delay portion 31 is high. The output signal of the multivibrator 36 is supplied to the input terminal IN2 of the multivibrator 37 forming the pulse detecting portion 35. Here, the multivibrator 37 generates a signal of high or low, and the signal generated from the output terminal /Q can sufficiently maintain the high or low state by increasing the time constant value of the resistor R1 and capacitor C1 connected to one side thereof, so that the multivibrator 37 supplies a low signal of 0 V as shown in FIG. 9D via its inverted output terminal /Q.

On the other hand, one input terminal of the exclusive OR gate 38 in the pulse converting portion 34 is supplied with the output of the multivibrator 37 as illustrated in FIG. 9D, and other input terminal thereof is supplied with the output from the sync signal processing portion 33 as illustrated in FIG. 9E. Since the output of the multivibrator 37 is the low signal as shown in FIG. 9D, the exclusive OR gate 38 outputs the sync signal from the sync signal processing portion 33 unchanged as shown in FIG. 9F. The output of the exclusive OR gate 38 is supplied to the input terminal IN2 of the multivibrator 39 in the clamp signal generating portion 24. At this time, since the input terminal IN2 of the multivibrator 39 is set to be operated by recognizing the pulse at the falling edge, the multivibrator 39 generates the blanking signal through the non-inverted terminal Q and the clamp signal through the inverted output terminal /Q at the falling edge of the output pulse of the exclusive OR gate 38, as shown in FIGS. 9G and 9H. During this operation, the time constant (R2, C2) of the multivibrator 39 determines the pulse width of the clamp signal. Accordingly, as shown in FIG. 9, the clamp signal generating portion 24 generates the clamp signal triggered at the back porch of the sync signal from the sync signal processing portion 33 when the sync on green signal is solely received thereto.

Second, if the sync on green signal and the TTL level sync signal are simultaneously received, the recognition and processing are identically carried out to those of inputting the sync on green signal. That is, the clamp signal triggered at the back porch of the sync signal generated from the sync signal processing portion 33 is supplied. Then, the case that TTL level sync signal is solely supplied will be described. In this case, since the sync on green signal does not exist, the output of the sync signal separating portion 17 supplies the blanking period shown in FIG. 10A as the sync signal to the sync signal selecting portion 18. The sync signal selecting portion 18 selects the sync signal from the TTL level sync signal processing/mixing portion 21 to output the selected sync signal to the sync signal processing portion 33 which in turn supplies the sync signal having the positive polarity as shown in FIG. 10B to the sync on green signal discriminating portion 32 and pulse converting portion 34.

At this time, since the output of the delay 31 is in the low state at the rising edge of the sync signal from the sync signal processing portion 33, the multivibrator 36 being the sync on green signal discriminating portion 32 supplies the high signal Vcc shown in FIG. 10C to the input terminal IN2 of the multivibrator 37 in the pulse detecting portion 35 via the inverted output terminal /Q. The input terminal IN2 of the multivibrator 37 in the pulse detecting portion 35 is set to recognize the pulses at the falling edge, and the signal supplied to the input terminal IN2 is high, so that the multivibrator 37 in the pulse detecting portion 35 supplies the high signal as shown in FIG. 10D to one input terminal of the exclusive OR gate 37 in the pulse converting portion 34 via the inverted output terminal /Q thereof.

Since the other input terminal of the exclusive OR gate 38 is supplied with the sync signal from the sync signal processing portion 33 as shown in FIG. 10E, the exclusive OR gate 38 inverts the sync signal from the sync signal processing portion 33 as shown in FIG. 10F to supply the inverted sync signal to the input terminal IN2 of the multivibrator 39 in the clamp signal generating portion 24.

Since the input terminal IN2 of the multivibrator 39 is set to be operated by recognizing the pulse at the falling edge, the multivibrator 39 outputs the clamp signal triggered at the front porch of the sync signal from the sync signal processing portion 33 to the clamp signal output portion 25 at the falling edge of the output pulse from the exclusive OR gate 38, as shown in FIGS. 10G and 10B. At this time, the time constant (R2, C2) of the multivibrator 39 determines the pulse width of the clamp signal.

Accordingly, the delay circuit for delaying the sync on green signal for a predetermined period and the plurality of multivibrator are formed to supply the clamp signal triggered at the back porch of the sync signal when the sync on green signal and TTL level sync signal are simultaneously received or only the sync on green signal is received; whereas the clamp signal triggered at the front porch of the sync signal is supplied when only the TTL level sync signal is received. Therefore, the video signal is stably amplified to widen the receiving range of the monitor, and the user has no need to separately adjust the monitor in accordance with the state of the sync input signal.

Figure 11:
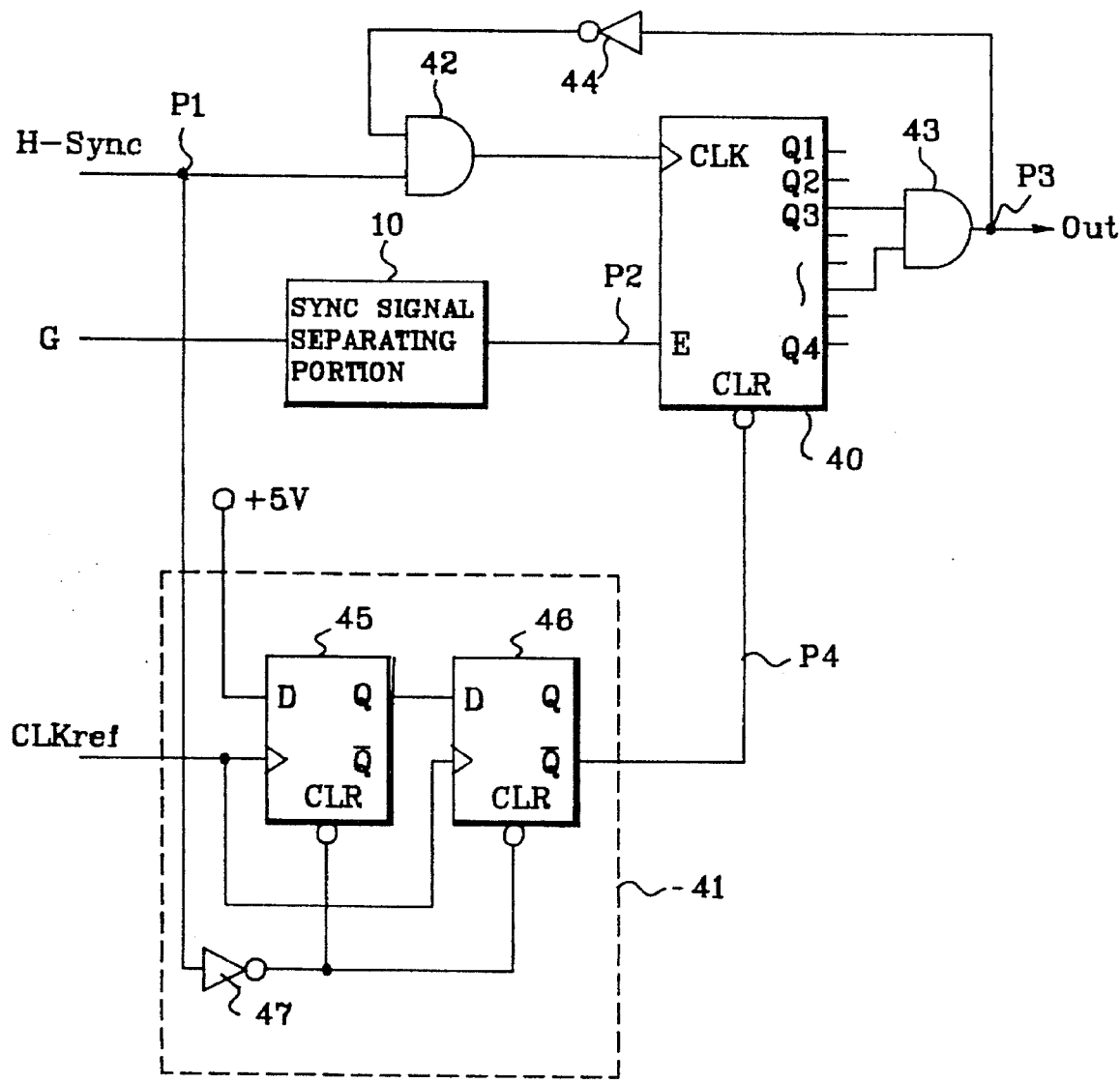
FIG. 11 is a detailed circuit diagram showing the clamp signal controlling portion of FIG. 6.

FIG. 11 is a detailed circuit diagram showing the clamp signal controlling portion 30 of FIG. 6. An output signal of the sync signal separating portion 10 obtained by inverting and amplifying the blanking period of the supplied green signal by a predetermined level as a reference is supplied to an enable terminal E of a counter 40, the output of a separate sync signal discriminating portion 41 for discriminating the existence of the separate sync signal is supplied to a clear terminal CLR of the counter 40, and an input signal of the horizontal sync signal input terminal H SYNC is supplied to one input side of an AND gate 42. An output signal Out of an AND gate 43 for logical production of the outputs from optional two output terminals (a third output terminal Q3 and a sixth output terminal Q6 in the drawing) of the counter 40 is generated and, at the same time, supplied to the other input side of the AND gate 42 via an inverter 44. An output of the AND gate 42 is supplied to a clock terminal CLK of the counter 40. The reason for using the third and sixth output terminals Q3 and Q6 in the counter 40 is for counting for a predetermined time, in which the counting time can be varied and the output terminal used in the counter 40 becomes different according to the varied counting time.

On the other hand, the separate sync signal discriminating portion 41 is formed of two flip-flops 45 and 46. An input terminal D of the flip-flop 45 is coupled with a voltage terminal of +5 V, a clock terminal is coupled with a reference clock CLKref for supplying a reference clock (e.g., 20 Hz), and a clear terminal CLR is connected to receive the H-SYNC inverted by an inverter 47. The output terminal Q of the flip-flop 46 is connected to a clear terminal CLR of the counter 40.

FIGS. 12A, 12B and 12C are operational waveforms showing operational states of respective portions in FIG. 11, in which FIG. 12A is a waveform of the operation of respective portions when the separate sync signal is solely supplied, FIG. 12B is a waveform of the operation of respective portions when the sync on green signal and separate sync signal are simultaneously received, and FIG. 12C is an operational waveform of respective portions when the sync on green signal is solely received.

Figure 12:
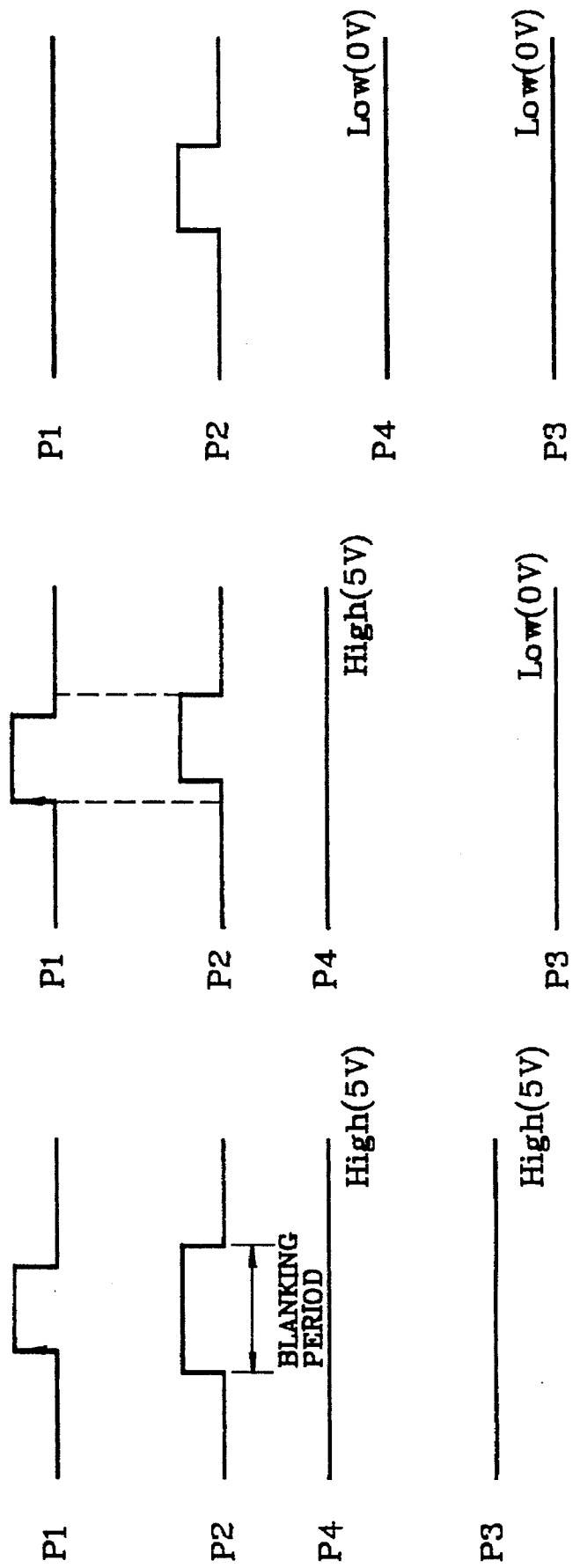
FIGS. 12A to 12C illustrate operational waveforms showing operational states of respective portions in FIG. 11.

The operation of the portions shown in FIG. 11 will be described with reference to FIG. 12. The cases that only the separate sync signal is supplied, the separate sync signal and sync on green signal are simultaneously supplied, and only the sync on green signal is supplied will be separately described.

(1) When only the separate sync signal is supplied:

The H-SYNC as a waveform P1 shown in FIG. 12A is supplied, and the G signal is supplied to the sync signal separating portion 10. The sync signal separating portion 10 compares the received G signal with a voltage of a predetermined level, and inverts and amplifies the signal below the predetermined level to output the resultant signal. At this time, since the G signal is not mixed with the sync signal, the video signal section and blanking section are divided as a waveform P2 shown in FIG. 12A, Consequently, the waveform P2 is supplied to the enable terminal E of the counter 40 to thereby enable the counter 40.

For the reason that the reference clock signal CLKref supplied to the clock terminals of the flip-flops 45 and 46 in the separating portion sync signal discriminating portion 41 is approximately 20 Hz), a predetermined number of H-SYNCs may be included for one period of the reference clock signal. The flip-flop 45 is operated at the first rising edge of the reference clock CLKref, and the flip-flop 46 is operated at the second rising edge of the reference clock CLKref. Thus, if the H-SYNC having the waveform P1 in FIG. 12A is supplied to the clear terminal CLR of the flip-flops 45 and 46 of the separate sync signal discriminating portion 41 via the inverter 47, the flip-flops 45 and 46 are continuously cleared by means of the H-SYNC prior to reaching the second rising edge of the reference clock CLKref. As a result, a high signal is supplied to the clear terminal CLR of the counter 40 as a waveform P4 shown in FIG. 12A, so that the counter 40 begins counting in response to the H-SYNC.

By performing the counting operation by the counter 40 for a predetermined time, both output signals of the third and sixth output terminals Q3 and Q6 go to high, and then the output signal of the AND gate 43 becomes the high signal as a waveform P3 shown in FIG. 12A. The high signal from the AND gate 43 is inverted by the inverter 44 and supplied to the AND gate 42, so that the output of the counter 40 is controlled to continuously maintain the output of the counter 40.

(2) When the sync on green signal and the separate sync signal are simultaneously supplied:

If the sync on green signal and the separate sync signal are simultaneously supplied, the sync on green signal is the same as the separate sync signal or slight delay occurs due to the characteristic of the video card. Moreover, somewhat delay occurs during cutting, inverting and amplifying the sync on green signal to a predetermined level by the sync signal separating portion 10. Therefore, when the H-SYNC as a waveform P1 shown in FIG. 12B is received, the sync signal from the sync signal separating portion 10 is delayed for a predetermined period as a waveform P2 shown in FIG. 12B.

Consequently, the output (P2 of FIG. 12B) of the sync signal separating portion 10 supplied to the enable terminal E of the counter 40 is in the low state at the rising edge of the H-SYNC (P1 of FIG. 12B) supplied to the clock terminal of the counter 40, the counter 40 cannot be enabled regardless of the signal received from the clear terminal CLR thereof to continuously output the low signal as a waveform P3 shown in FIG. 12B. Also, the separate sync signal discriminating portion 41 supplies the high signal as in the case of receiving only the separate sync signal.

(3) When only the sync on green signal is supplied:

If the sync on green signal is solely supplied, the H-SYNC signal in the low state as a waveform P1 of FIG. 12C is inverted into the high state by means of the inverter 47 to be supplied to the clear terminal CLR of the flip-flops 45 and 46 in the separate sync signal discriminating portion 41, so that the flip-flops 45 and 46 are operated by the reference clock CLKref to supply the low signal as a waveform P4 shown in FIG. 12C to the counter 40 via the output terminal Q of the flip-flop 46 at the rising edge of the second reference clock CLKref.

The sync on green signal is compared with the predetermined level in the sync signal separating portion 10, and the signal below the level is inverted and amplified to be a waveform P3 shown in FIG. 12C and then supplied to the enable terminal E of the counter 40 to enable the counter 40.

However, the counter 40 is cleared by the low signal from the separate sync signal discriminating portion 41, the low signal as a waveform P3 shown in FIG. 12C is necessarily generated via the AND gate 44 regardless of the enable signal. Thus, since the existence of the sync on green signal is discriminated in connection with the output of the counter 40, the triggering point of the clamp signal can be automatically controlled.

As a result, using the flip-flops and counter, the existence of the sync signal mixed with the G signal is automatically discriminated to automatically control the triggering point of the clamp signal, which eliminates inconvenience of manual switching and prevents malfunction occurring due to user's direct output position control of the clamp signal.

Figures 4, 5:
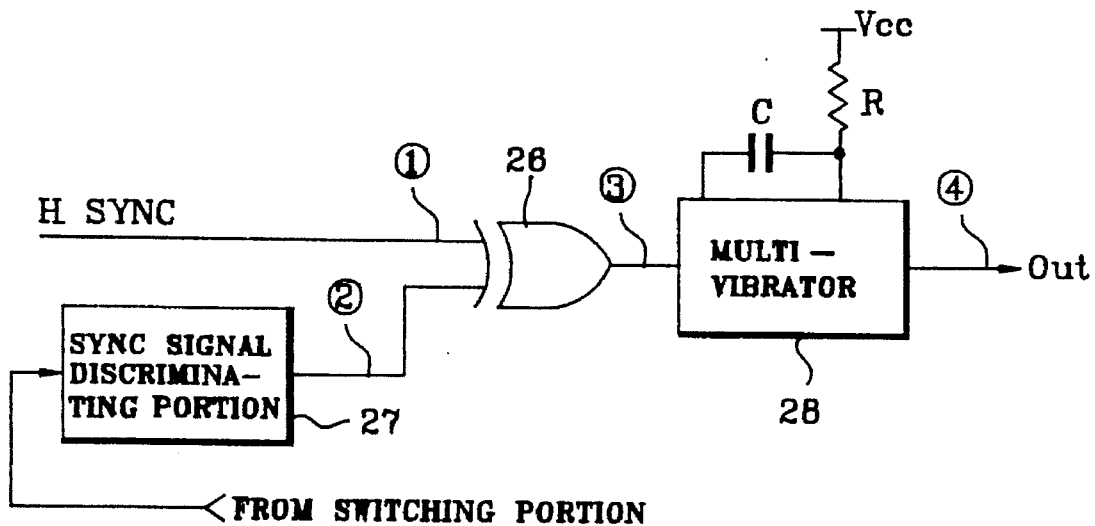
FIG. 4 is a detailed circuit diagram showing the conventional clamp signal generating portion of FIG. 2.
FIG. 5 illustrate waveforms illustrating operational states of respective portions in FIG. 4.
Figure 13:
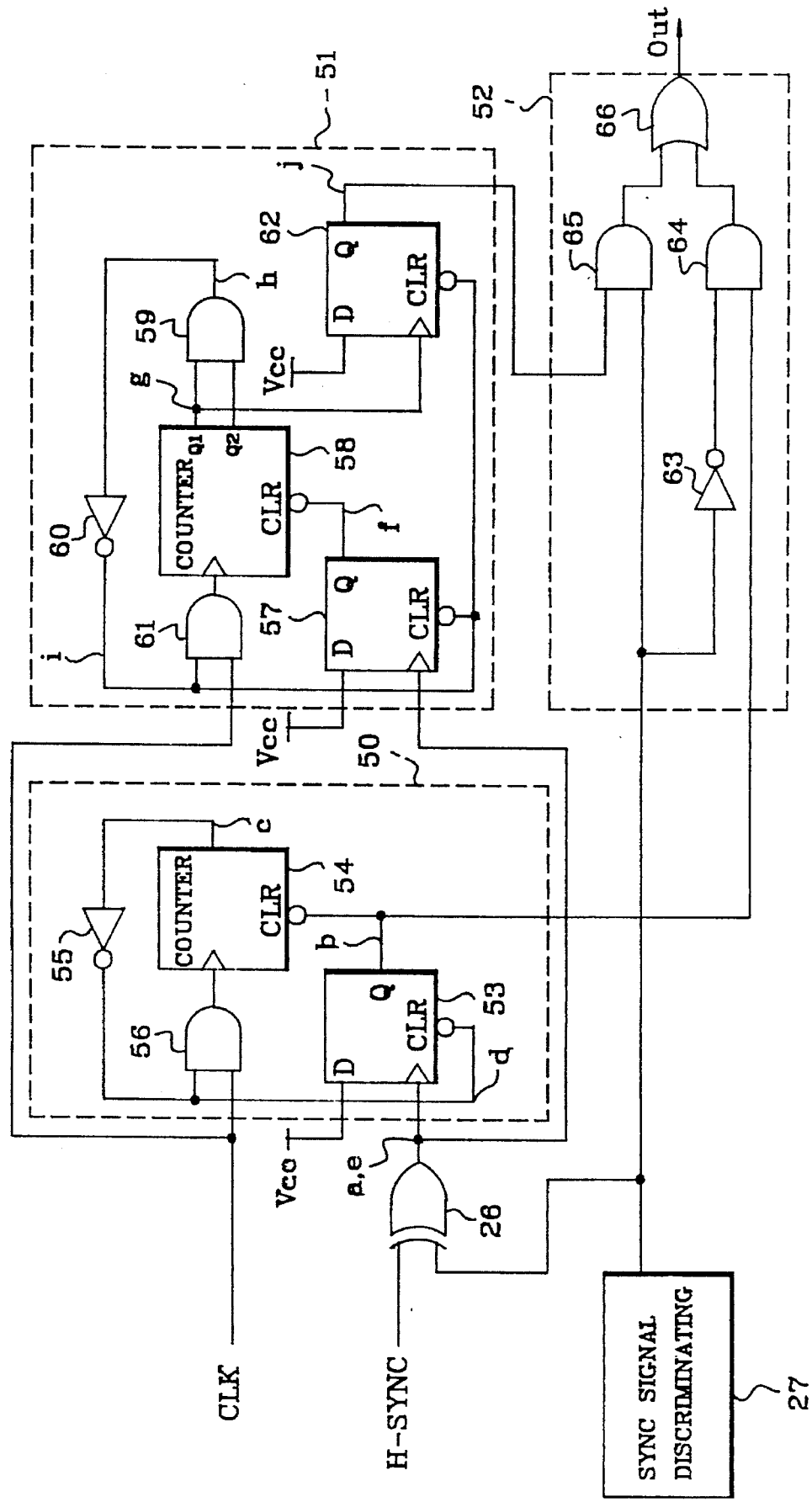
FIG. 13 is a detailed circuit diagram showing an embodiment of the clamp signal generating portion of FIG. 6.

FIG. 13 is a detailed circuit diagram showing an embodiment of a clamp signal generating portion according to the present invention, which complements that shown in FIG. 4. The same reference numerals used in FIG. 4 designate the same parts, which thus will be omitted.

Here, a sync signal discriminating portion 27 outputs a logic signal of high/low level by discriminating a sync signal supplied to the monitor whether it is the separate sync signal or the sync on green signal, and one input terminal of an exclusive OR gate 26 is constantly supplied with a H-SYNC of a constant level and other input terminal thereof is supplied with an output signal of the sync signal discriminating portion 27. A clamp signal generating portion 50 receives an output signal of the exclusive OR gate 26 and a clock signal CLK, and generates a 7 clamp signal triggered at the back porch of the H-SYNC. A delay portion 51 receives the output signal of the exclusive OR gate 26 and the clock signal CLK, and generates the clamp signal triggered after being delayed by a predetermined period at the front porch of the H-SYNC. A clamp signal selecting portion 52 connected to the output terminals of the sync signal discriminating portion 27, clamp signal generating portion 50 and delay portion 51 selectively supplies the outputs of the clamp signal generating portion 50 and the delay portion 51 in response to the output of the sync signal discriminating portion 27.

In the clamp signal generating portion 50, a flip-flop 53 having an input terminal D connected to the power supply voltage, a clock terminal connected to the output terminal of the exclusive OR gate 26 has an output terminal Q simultaneously connected to the clear input terminal CLR of the counter 54 and the clamp signal selecting portion 52.

The output terminal of the counter 54 is simultaneously connected to one input terminal of the AND gate 56 and the clear terminal CLR of the flip-flop 53 via the inverter 55. Other input terminal of the AND gate 56 is connected to the clock terminal CLK. The output terminal of the AND gate 56 is connected to the clock terminal of the counter 54.

In the delay portion 51, a flip-flop 57 having an input terminal D connected to the power source terminal and a clock terminal connected to the output terminal of the exclusive OR gate 26 has an output terminal Q of the flip-flop 57 connected to the clear input terminal CLR of the counter 58, and the output terminals Q1 and Q2 are respectively connected to two input terminals of an AND gate 59. The output terminal of the AND gate 59 is connected to one input terminal of the AND gate 61 via an inverter 60 and the clear terminals of the flip-flops 57 and 62. Other input terminal of the AND gate 61 is supplied with the clock signal, and the output terminal of the AND gate 61 is connected to the clock terminal of the counter 58. An input terminal D of a flip-flop 62 is connected to the power source voltage, and a clock terminal is connected to the output terminal Q1 of the counter 58. An output Q of the flip-flop 62 is connected to the clamp signal selecting portion 52.

Meanwhile, in the clamp signal selecting portion 52, the output terminal of the sync signal discriminating portion 27 is connected to one input terminal of an AND gate 64 via an inverter 63 and directly connected to one input terminal of an AND gate 65. Other input terminal of the AND gate 64 is connected to the output terminal Q of the flip-flop 53 in the clamp signal generating portion 50 and the clear terminal CLR of the counter 54, and the output terminal of the AND gate 64 is connected to one input terminal of an OR gate 66. Other input terminal of the AND gate 65 is connected to the output terminal Q of the flip-flop 62 in the delay portion 51, and the output terminal of the AND gate 65 is connected to other input terminal of the OR gate 66. The clamp signal is generated via an output terminal Out of the OR gate 66.

FIG. 14 illustrate waveforms showing operational states of respective portions of the clamp signal generating portion according to the present invention, in which H-SYNC is a waveform of the horizontal sync signal supplied while having a predetermined period. FIG. 14A is an output waveform of the exclusive OR gate 26 when the sync signal is the sync on green signal, FIG. 14B is of the flip-flop 53 in the clamp signal generating portion 50, FIG. 14C is of the counter 54 in the clamp signal generating portion 50, and FIG. 14D is a waveform output from the inverter 55 to the clear terminal of the flip-flop 53 in the clamp signal generating portion 50. FIG. 14E is an output waveform of the exclusive OR gate 26 when the sync signal is the separate sync signal, FIG. 12F is of the flip-flop 57 in the delay portion 51, FIG. 12G is of the first output terminal Q1 of the counter 58 in the delayer portion 51, FIG. 12H is of the AND gate 59 in the delay portion 51, FIG. 12I is a waveform output from the inverter 60 to the clear terminal of the flip-flop 57 in the delay portion 51, and 12J is an output waveform of the flip-flop 62 in the delay portion 51.

In the present invention constructed as above, the sync signal discriminating portion 27 discriminates the sync signal supplied to the monitor whether it is the sync on green signal mixed with the G signal, the separate sync signal separated from the G signal, or the simultaneously supplied sync on green signal and separate sync signal, so that the sync signal discriminating portion 27 supplies the logic signal of the low level when the sync signal is the sync on green signal or the simultaneously supplied sync on green signal and separate sync signal, or the logic signal of the high level to one input terminal of the exclusive OR gate 26 when only the separate sync signal is supplied.

Meantime, since other input terminal of the exclusive OR gate 26 is continuously supplied with the H-SYNC having the positive polarity, in conformity with the characteristic of the exclusive OR gate for outputting the logic signal of the high level if either input of two is high level, the exclusive OR gate 26 supplies the H-SYNC having the negative polarity when the output of the sync signal discriminating portion 27 is the logic signal of the high level, or supplies the H-SYNC having the positive polarity to the clock terminal of the flip-flop 53 in the clamp signal generating portion 50 and the clock terminal of the flip-flop 57 in the delay portion 51 when the output of the sync signal discriminating portion 27 is the logic signal of the low level.

In this case, the flip-flop 53 of the clamp signal generating portion 50 is operated when the H-SYNC having the positive polarity is received to the clock terminal thereof, and the flip-flop 57 of the delay portion 51 is operated when the H-SYNC having the negative polarity is input to the clock terminal thereof. This is because, the output of the clamp signal generating portion 50 is the clamp signal triggered at the back porch of the H-SYNC, and the output of the delay portion 51 is the clamp signal triggered at the front porch of the H-SYNC.

The output of the counter 53 in the clamp signal generating portion 50 is set to count for 1 s, and outputs A and B of the counter 58 in the delay portion 51 is set to count for 280 ns and 1 µs, respectively.

First, the cases that the sync on green signal is solely supplied or the sync on green signal and separate sync signal are simultaneously supplied will be described in detail. When only the sync on green signal or both the sync on green signal and separate sync signals are supplied to the monitor, the sync signal discriminating portion 27 supplies the logic signal of the low level to the exclusive OR gate 26 and the AND gate 64 via the inverter 63 of the clamp signal selecting portion 52, and directly to the AND gate 65. Therefore, the output of the AND gate 64 of the clamp signal selecting portion 52 is varied in response to the output from the clamp signal generating portion 50, and the AND gate 65 necessarily supplies the low signal regardless of the output of the delay portion 51.

Thus, the clamp signal generated via the final output terminal Out of the clamp signal selecting portion 52 is the output of the clamp signal generating portion 50. In other words, the clamp signal selecting portion 52 selects the output of the clamp signal generating portion 50 if the output from the sync signal discriminating portion 27 is low, while it selects the output of the delay portion 51 if the output from the sync signal discriminating portion 27 is high.

Since other input terminal 26 of the exclusive OR gate supplied with the low output of the sync signal discriminating portion 27 is supplied with the H-SYNC having the positive polarity as shown in FIG. 14 via the horizontal sync signal terminal H SYNC, the exclusive OR gate 26 generates a waveform shown in FIG. 14A which is identical to the H-SYNC of FIG. 14 to the flip-flop 53 of the clamp signal generating portion 50 and the flip-flop 57 of the delay portion 51.

At this time, the moment the output waveform of the exclusive 0R gate 26 goes to the falling edge, the flip-flop 57 in the delay portion 51 is disabled, and the output Q of the flip-flop 53 in the clamp signal generating portion 50 goes to high to be output to the clear terminal CLR of the counter 54 and the AND gate 64 of the clamp signal generating portion 52.

Here, the high output of the flip-flop 53 clears the counter 54, the counter 54 counts for 1 µs as shown in FIG. 14B. After elapsing 1 µs, the output of the counter 54 becomes high as shown in FIG. 14C. The high output of the counter 54 is inverted as shown in FIG. 14D by means of the inverter 55 to be supplied to the clear terminal of the flip-flop 53, so that the counter 54 is reset and the flip-flop 53 is cleared to make the output of the flip-flop 53 low.

Therefore, whenever the H-SYNC is supplied, the above-described operation is repeated to form the clamp signal having the width of 1 s which is then triggered at the back porch of the sync signal as shown in FIG. 14B via the output terminal Out of the OR gate 66 in the clamp signal selecting portion 52.

On the other hand, the case that the separate sync signal is solely supplied to the monitor will be described.

When only the separate sync signal is supplied to the monitor, the sync signal discriminating portion 27 supplies the logic signal of the high level to the exclusive OR gate 26 and the AND gate 64 via the inverter 63 in the clamp signal selecting portion 52, and directly to the AND gate 65. Therefore, The output of the AND gate 64 in the clamp signal selecting portion 52 is necessarily generates the low signal regardless of the output from the clamp signal generating portion 50, and the output of the AND gate 65 is varied in accordance with the output from the delay portion 51. That is, the clamp signal from the final output terminal Out of the clamp signal selecting portion 52 is the output of the delay portion 51.

The other input terminal of the exclusive OR gate 26 supplied with the high output of the sync signal discriminating portion 27 is supplied with the H-SYNC having the positive polarity via the horizontal sync signal terminal H SYNC as shown in FIG. 14. Thus, the exclusive OR gate 26 supplies a waveform as shown in FIG. 14E which is an inverted H-SYNC waveform of FIG. 14 to the flip-flop 53 of the clamp signal generating portion 50 and the flip-flop 57 of the delay portion 51.

At this time, the moment the output waveform of the exclusive OR gate 26 goes to the falling edge as shown in FIG. 14E, the flip-flop 53 in the clamp signal generating portion 50 is disabled, and the output Q of the flip-flop 57 in the delay portion 51 becomes high to be supplied to the clear input terminal CLR of the counter 58 and the AND gate 65 of the clamp signal generating portion 50.

Since the high output of the flip-flop 57 of the delay portion 51 clears the counter 58, the counter 58 begins counting as shown in FIG. 14F. While counting the counter 58 for 280 ns, the output Q1 of the counter 58 becomes high as shown in FIG. 14G, and the high output of the output terminal Q1 in the counter 58 enables the flip-flop 58, thereby making the output Q of the flip-flop 62 goes to high as shown in FIG. 14J.

At this time, the counter 58 continues the counting. Then, after elapsing 1.28 μs, both outputs Q1 and Q2 of the counter 58 go to high as shown in FIGS. 14G and 14H to allow the output of the AND gate 59 to be high. The high output of the AND gate 59 is inverted by means of the inverter 60 as shown in FIG. 14I to be supplied to the AND gate 61 and the clear terminal of the flipsflops 57 and 62, so that the counter 58 is reset and the flip-flops 57 and 62 are cleared. Thus, the output Q of the flip-flops 57 and 62 goes to low as shown in FIG. 14J.

That is, whenever the H-SYNC is received, the above-described process is repeated to output the clamp signal having the width of 1 s delayed for 280 ns is triggered at the front porch of the sync signal as shown in FIG. 14J via the output terminal of the OR gate 66 in the clamp signal selecting portion 52 to be generated.

As a result, the delay circuit for delaying the clamp signal when the separate sync signal is supplied and the selecting portion are provided to output the clamp signal normally triggered at the back porch of the sync signal when the sync on green signal is received, or output the clamp signal triggered at the front porch of the sync signal after being delayed for a predetermined time when the separate sync signal is solely received, thereby simultaneously inducing the blanking timing and sync timing.

In the clamp signal generation-control circuit and method therefor according to the present invention as described above, the inputs of the sync on green signal and separate sync signal are discriminated to adjust the trigger position of the clamp signal generated in accordance with the sync signal, so that the trigger position of the clamp signal can be automatically controlled to eliminate the inconvenience of manual switching and prevent malfunction caused due to a user's control of the clamp signal output position.

While the present invention has been particularly shown and described with reference to particular embodiments thereof, it will be understood by those skilled in the art that various changes in form and details may be effected herein without departing from the spirit and scope of the invention as defined by the appended claims.

What is claimed is:

1. A clamp signal generation-control circuit having a clamp signal controlling circuit including a sync signal separating portion for separating and outputting a sync signal mixed with a green signal in a video signal, a sync signal selecting portion receiving said sync signal mixed with the green signal from said sync signal separating portion and also separately receiving horizontal and vertical sync signals from an input thereof for selectively outputting said sync signal from said sync signal separating portion and said horizontal and vertical sync signals in accordance with a previously-set priority, a horizontal/vertical sync signal separating portion for separating and outputting horizontal and vertical sync signals received from said sync signal selecting portion, and a clamp signal generating portion connected to said sync signal selecting portion for triggering a clamp signal at a predetermined edge of the sync signal supplied from said sync signal selecting portion, said clamp signal generation-control circuit comprising:

clamp signal controlling means connected to said sync signal separating portion and said sync signal selecting portion for discriminating the mixing of said sync signal with said green signal and the input of horizontal and vertical sync signals, said clamp signal controlling means also being connected to the clamp signal generating portion for controlling the output of said clamp signal generating portion.

2. A clamp signal generation-control circuit as claimed in claim 1, wherein said clamp signal controlling means comprising:

a separate sync signal discriminating portion for discriminating the existence of said horizontal sync signal supplied from said sync signal selecting portion, and outputting the result of the discrimination as a logic signal;

a counter cleared by said logic signal supplied from said separate sync signal discriminating portion and enabled by the signal from said sync signal separating portion for counting the signal supplied to a clock terminal thereof for a predetermined time and outputting the counted signal as a clamp control signal; and feedback means for performing a logical production of a signal obtained by inverting said clamp control signal from said counter with said horizontal sync signal, and supplying the result of said logical production to said clock terminal of said counter.

3. A clamp signal generation-control method for controlling the output of a clamp signal by determining a sync signal whether it is a sync signal mixed with a video signal or an internally-separated sync signal comprising the steps of:

outputting said clamp signal of low level when it is discriminated that said sync signal is not mixed with a green signal or it is not supplied via an input terminal of a horizontal/vertical sync signal input terminal;

generating the clamp signal triggered at the back porch of said sync signal when it is discriminated that only said sync signal is mixed with said green signal;

generating said clamp signal triggered at the back porch of said sync signal when it is discriminated that said sync signal is mixed with said green signal, and, at the same time, said sync signal is supplied via said horizontal/vertical sync signal input terminal; and generating said clamp signal triggered at the front porch of said sync signal when it is discriminated that said sync signal is not mixed with said green signal, but said sync signal is supplied via only said horizontal/vertical sync signal input terminal.

4. A clamp signal generation-control circuit including a sync on green signal separating portion for separating only a sync signal from a sync on green signal received via a sync on green signal input portion, a TTL level sync signal processing/mixing portion for selecting and mixing either one of first and second TTL level sync signals supplied via first and second TTL level sync signal input portions, a sync signal selecting portion for selectively outputting sync signals from said sync on green signal separating portion and said TTL level sync signal processing/mixing portion, a sync signal processing portion for constantly maintaining the polarity of said sync signal supplied from said sync signal selecting portion, and a clamp signal generating portion for converting the trigger position of a clamp signal in accordance with the polarity of the input signal, said clamp signal generation-control circuit further comprising:

a delay portion for delaying the output signal of said sync on green signal separating portion by a predetermined time;

a sync on green signal discriminating portion for discriminating the existence of the sync on green signal, using said output signals from said delay portion and sync signal processing portion;

a pulse detecting portion for outputting a logic signal in response to the result of the discrimination of the existence of said sync on green signal from said sync on green signal discriminating portion; and a pulse converting portion for converting the polarity of the signal supplied from said sync signal processing portion to said clamp signal generating portion in accordance with said logic signal from said pulse detecting portion.

5. A clamp signal generation-control circuit as claimed in claim 4, wherein said sync on green signal discriminating portion comprises a multivibrator having a clear terminal for receiving the signal from said delay portion, a second input terminal fixed to low at the moment said signal from said sync signal processing portion is supplied to a first input terminal thereof, and an inverted outputting terminal for outputting a discrimination signal.

6. A clamp signal generation-control circuit as claimed in claim 4, wherein said pulse detecting portion comprises a multivibrator having a clear terminal and a first input terminal fixed to high, of which time constant is determined by a capacitor and a resistor connected to second and third input terminals for outputting pulses to an inverted output terminal in response to said discrimination signal from said sync on green signal discriminating portion received via a fourth input terminal thereof.

7. A clamp signal generation-control circuit as claimed in claim 4, wherein said pulse converting portion comprises an exclusive OR gate for exclusively summing the first input signal from said sync signal processing portion with the second input signal from said pulse detecting portion, and outputting the result of the sum to said clamp signal generating portion.

8. A clamp signal generation-control circuit for controlling an output of a clamp signal generated in accordance with the type of a sync signal supplied to a monitor, including a sync signal discriminating portion for discriminating said sync signal supplied to said monitor whether it is a sync on green signal or a separate sync signal to output a logic signal, and an exclusive OR gate for exclusively summing said logic signal from said sync signal discriminating portion with said separate sync signal to output the result of the sum, said clamp signal generation-control circuit further comprising:

a clamp signal generating portion for outputting a signal triggered at the back porch of a horizontal sync signal when said logic signal from said sync signal discriminating portion corresponds to said sync on green signal;

a delay portion for outputting said clamp signal triggered after being delayed for a predetermined time at the front porch of said horizontal sync signal when said logic signal from said sync signal discriminating portion corresponds to said separate sync signal; and a clamp signal selecting portion for selectively generating outputs from said clamp signal generating portion and said delay portion in response to the input of the discriminating logic signal of said sync signal discriminating portion.

9. A clamp signal generation-control circuit as claimed in claim 8, wherein said clamp signal generating portion comprises:

a first flip-flop having an input terminal fixed to high for outputting a signal of logic high when a signal of positive polarity is supplied from said exclusive OR gate after being cleared by a feedback signal; and a first counter for initiating a counting operation upon inputting of the output signal from said first flip-flop as a clear signal and said feedback signal logically produced with a reference clock, and inverting said output signal to output as a feedback signal.

10. A clamp signal generation-control circuit as claimed in claim 8, wherein said delay portion comprises:

a second flip-flop having an input terminal fixed to high for outputting a signal of logic high when a signal of negative polarity is supplied from said exclusive OR gate after being cleared by said feedback signal;

a second counter for initiating a counting operation of a signal obtained by logically producing said reference clock and said feedback signal for a predetermined time upon inputting of the output signal from said second flip-flop as a clear signal, and outputting first and second counting signals;

feedback means for logically producing said first and second counting signals from said second counter, and inverting the result of the logical production to supply said feedback signal; and a third flip-flop having an input terminal fixed to high for outputting a signal delayed by a predetermined time as compared with a clock signal upon inputting of said feedback signal as a clear signal and said first counting signal as said clock signal.

11. A clamp signal generation-control circuit as claimed in claim 8, wherein said clamp signal selecting portion supplies a signal obtained by logically summing a signal resulting from logically producing said output signal from said sync signal discriminating portion and said output signal of said delay portion with a signal resulting from logically producing the inverted signal of said output signal from said sync signal discriminating portion and the output signal from said first flip-flop in said clamp signal generating portion.

\* \* \* \* \*